United States Patent [19]

Peterson et al.

[11] 4,341,484
[45] Jul. 27, 1982

[54] HYDRAULICALLY EXPANDABLE FRICTION COUPLING

[75] Inventors: Börje Peterson, Linköping; Ulf Lundqvist, Mjölby, both of Sweden

[73] Assignee: FFV Industriprodukter AB, Eskilstuna, Sweden

[21] Appl. No.: 182,586

[22] Filed: Aug. 29, 1980

[30] Foreign Application Priority Data

Aug. 31, 1979 [SE] Sweden .................................. 7907277

[51] Int. Cl.³ .............................................. F16D 1/08
[52] U.S. Cl. .................................. 403/5; 192/85 AT; 464/28; 464/30
[58] Field of Search ................. 403/5; 64/30 D, 30 E, 64/11 P; 192/88 B, 85 AT, 76

[56] References Cited

U.S. PATENT DOCUMENTS

| | | | |
|---|---|---|---|
| 2,093,281 | 9/1937 | Kreuser | 192/85 AT |
| 3,486,776 | 12/1969 | LeBaron | 403/5 |
| 3,861,815 | 1/1975 | Landaeus | 192/76 X |
| 4,093,052 | 6/1978 | Falk | 192/88 B |

FOREIGN PATENT DOCUMENTS

| | | | |
|---|---|---|---|
| 2659547 | 7/1978 | Fed. Rep. of Germany | 403/5 |
| 470122 | 7/1975 | U.S.S.R. | 403/5 |

*Primary Examiner*—Andrew V. Kundrat
*Attorney, Agent, or Firm*—Fleit & Jacobson

[57] ABSTRACT

In a hydraulically expandable friction coupling for connecting a shaft to a hub there are two concentrically arranged cylindrical sleeves between which a pressure medium is enclosed. The pressure of said pressure medium against the sleeves is adjustable by adjusting means in order to transmit a predetermined torque between the shaft and the hub. In order to ensure slipping between the outer sleeve and the hub when said predetermined torque is exceeded i.e. when the coupling is overloaded, the outer sleeve is formed with a greater wall thickness than the inner sleeve or at least one additional sleeve is fixed on the outside of the outer sleeve. The wall thickness of said additional sleeve is such that the combined wall thickness of the outer sleeve and the additional sleeve exceeds the wall thickness of the inner sleeve.

7 Claims, 2 Drawing Figures

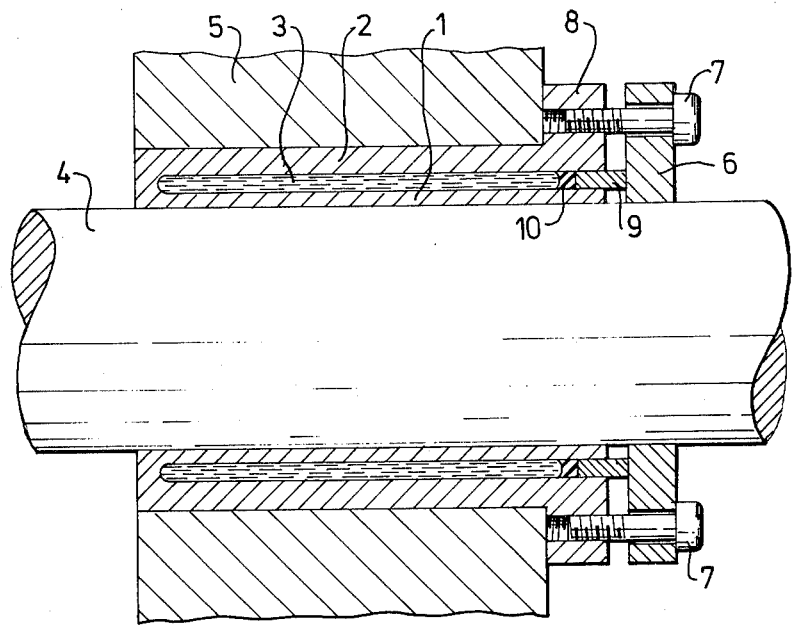
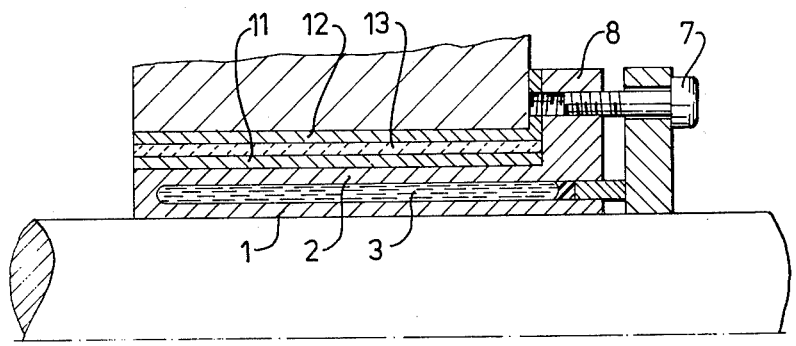

HYDRAULICALLY EXPANDABLE FRICTION COUPLING

TECHNICAL FIELD

This invention pertains a hydraulically expandable friction coupling for connecting a shaft to a hub, comprising two concentrically arranged cylindrical sleeves between which a pressure medium is enclosed, the pressure of said pressure medium against the sleeves being adjustable by adjusting means in order to transmit a predetermined torque between the shaft and the hub.

BACKGROUND ART

Such a friction coupling is known from e.g. British Patent Specification No. 1,037,249.

The disadvantage of such friction couplings is that slipping in most cases occurs between the inner sleeve and the shaft when the coupling is overloaded whereby the shaft itself can be damaged which in e.g. an electric motor can lead to high repair costs.

DISCLOSURE OF INVENTION

The object of the present invention is to ensure slipping between the outer sleeve and the hub when overloading occur in the friction coupling of the character involved.

This is attained either in that the outer sleeve is formed with a greater wall thickness than the inner sleeve or in that at least one additional sleeve is fixed on outside of the outer sleeve, the wall thickness of said additional sleeve being such that the combined wall thickness of the outer sleeve and the additional sleeve exceeds the wall thickness of the inner sleeve.

DESCRIPTION OF THE DRAWING

The invention will be described more in detail below with reference to the attached drawing on which FIG. 1 is a sectional view of an embodiment of a hydraulically expandable friction coupling according to the invention for connecting a shaft to a hub, and FIG. 2 is a sectional view of the upper part of a modified embodiment of the friction coupling according to FIG. 1.

PREFERRED EMBODIMENT

FIG. 1 shows an embodiment of a hydraulically expandable friction coupling according to the invention. The coupling comprises a cylindrical inner sleeve 1 of e.g. hardened steel, and concentrically with the inner sleeve is a cylindrical outer sleeve 2 also of hardened steel which sleeves are sealingly interconnected at one end as shown the sleeves 1 and 2 can be made in one piece. In the space between the sleeves 1 and 2, a pressure medium 3 is provided e.g. rubber, oil, grease or the like. In order to expand the sleeves 1 and 2 against a shaft 4 and a hub 5, respectively, to transmit a predetermined torque between the shaft 4 and the hub 5, there is a pressure ring 6 with tightening screws 7 that can be screwed into a flange 8 on the outer sleeve 2, which flange bears against the outside of the hub. An annular piston 9 that is located behind the pressure ring 6 and whose thickness conforms to the space between the inner sleeve 1 and the outer sleeve 2, is displaceable into this space in order to, via a sealing ring 10, increase the pressure of the pressure medium 3 against the sleeves 1 and 2 to a predetermined value to make it possible to transmit a desired torque between the shaft 4 and the hub 5.

In order to ensure slipping between the outer sleeve 2 and the hub 5, when the coupling is overloaded i.e. when said torque is exceeded, the coupling according to the invention is designed to transmit a greater torque against the shaft 4 than against the hub 5.

This can be accomplished in different ways:

In the embodiment of the hydraulic friction coupling according to the invention, shown in FIG. 1, slipping is obtained between the outer sleeve 2 and the hub 5 when the coupling is overloaded in that the outer sleeve 2 has been formed with a greater wall thickness than the inner sleeve 1. The outer surface pressure at the surface of the outer sleeve 2, facing the hub 5 will be substantially lower than the inner surface pressure on the surface of the inner sleeve 1, facing the shaft 4, whereby slipping will occur at a desired surface pressure by a suitable dimensioning of the wall thickness of the outer sleeve 2 relative to the wall thickness of the inner sleeve 1. Thus torque over a predetermined value is relieved at the outer surface of the shaft; preventing damage to the shaft, which obviates shaft-replacement, which in electric motors, for example, can be extremely expensive and time consuming.

Another way of making the outer sleeve 2 thicker than the inner sleeve 1 is to fix at least one additional sleeve 11 of, e.g., hardened steel on the outside of the outer sleeve 2 by welding, gluing or the like as shown in FIG. 2, the wall thickness of the additional sleeve 11 being such that the combined wall thickness of the outer sleeve 2 and the additional sleeve 11 exceeds the wall thickness of the inner sleeve 1.

In order to obtain the desired slippage the wall thickness of the outer sleeve 2, the combined wall thickness of the outer sleeve 2 and the additional sleeve 11 will be so chosen relative to the wall thickness of the inner sleeve 1 so that the surface pressure against the shaft is higher than the surface pressure against the hub.

In order to prevent wear by abrasion upon slippage in the embodiment shown in FIG. 2 a protective layer 12 of a material having a low friction coefficient, e.g. bronze, is fixed on the outside of the additional sleeve 11. For the case that the pressure medium 3 is temperature dependent the heat generated upon slippage, can cause certain problems. To eliminate such problems a heat insulating layer 13 of e.g. flame hardened ceramics can be fixed between the protective layer 12 and the additional sleeve 11.

Instead of a protective layer 12 a protective sleeve of e.g. bronze can of course be fixed on the outside of the additional sleeve 11. In the embodiment shown in FIG. 1 the heat insulating layer could of course applied directly on the outside of the outer sleeve 2, next to the hub, as shown in FIG. 2 whereupon the protective layer or the protective sleeve is applied on the outside of this heat insulating layer.

The protective layer alternatively the protective sleeve can also be fixed on the inside of the hub 5 per FIG. 2.

To further promote the slippage, the protective layer 12 alternatively the protective sleeve can exhibit a lubricating effect. In e.g. a flame hardened porous bronze layer this can be accomplished in that the layer before installation is soaked with oil and, then, wiped off. The oil that has penetrated into the pores of the layer, will expand by the heat generated upon slippage, whereby the oil will issue from these pores to further promote the slippage.

The protective layer 12 is preferably applied also on the side of the flange 8 on the outer sleeve 2, facing the outside of the hub 5 as shown in FIG. 2.

I claim:

1. A hydraulically expandable friction coupling for coupling a shaft to a hub, in which said coupling comprises concentrically arranged outer and inner cylindrical sleeves introduced between said shaft and said hub, said sleeves sealingly enclosing a pressure medium therebetween, adjusting means for exerting pressure through said pressure medium against the sleeves to transmit a torque between the shaft and the hub, the improvement characterized in that the outer sleeve is so formed with a greater wall thickness than the inner sleeve that initial slipping is ensured between the outer sleeve and said hub when said torque is increased over a predetermined value.

2. The coupling according to claim 1, wherein said outer and inner cylindrical sleeves are sealingly interconnected at one end, the sleeves having confronting surfaces spaced from each other to define a space for receiving the pressure medium; said adjusting means comprising a sealing ring for retaining pressure medium in the space, a pressure ring, means for interconnecting said pressure ring with said outer ring so that the pressure ring is movable towards and away from the outer ring, and an annular piston carried by said pressure ring movable into and out of the space between the outer and inner rings to thereby adjust pressure exerted on the pressure medium by the sealing ring.

3. The coupling according to claim 1, characterized in that said outer sleeve consists of at least two parts, said parts having a combined wall thickness which exceeds the wall thickness of the inner sleeve.

4. The coupling according to claim 1, characterized in that a protective layer and a protective sleeve are interposed between said hub and said outer sleeve.

5. The coupling according to claim 4, characterized in that at least one of the protective layer and the protective sleeve comprises a lubricating substance.

6. The coupling according to claim 4 or 5, characterized in that a heating insulating layer is fixed underneath to at least one of the protective layer or the protective sleeve.

7. The coupling according to claim 4 in which said protective layer and sleeve are secured to at least one at the inner surface of said hub and the outer surface of said outer sleeve.

* * * * *